US008321670B2

(12) United States Patent
Lior et al.

(10) Patent No.: US 8,321,670 B2
(45) Date of Patent: Nov. 27, 2012

(54) SECURING DYNAMIC AUTHORIZATION MESSAGES

(75) Inventors: Avi Lior, Ottawa (CA); Yong Li, Ottawa (CA)

(73) Assignee: Bridgewater Systems Corp., Ottawa (CA)

( * ) Notice: Subject to any disclaimer, the term of this patent is extended or adjusted under 35 U.S.C. 154(b) by 817 days.

(21) Appl. No.: 12/171,500

(22) Filed: Jul. 11, 2008

(65) Prior Publication Data

US 2010/0011215 A1     Jan. 14, 2010

(51) Int. Cl.
*H04L 9/32* (2006.01)
(52) U.S. Cl. ........................................... 713/168
(58) Field of Classification Search .............. 713/168; 726/2, 3, 4
See application file for complete search history.

(56) References Cited

U.S. PATENT DOCUMENTS

| | | | |
|---|---|---|---|
| 6,370,380 B1 * | 4/2002 | Norefors et al. | 455/436 |
| 6,775,704 B1 | 8/2004 | Watson et al. | |
| 6,961,857 B1 | 11/2005 | Floryanzia | |
| 7,072,354 B1 | 7/2006 | Beathard | |
| 7,249,374 B1 | 7/2007 | Lear et al. | |
| 7,624,429 B2 * | 11/2009 | Van Ackere et al. | 726/3 |
| 7,716,721 B2 * | 5/2010 | Zavalkovsky et al. | 726/2 |
| 2004/0105431 A1 | 6/2004 | Monjas-Llorente et al. | |
| 2004/0107360 A1 | 6/2004 | Herrmann et al. | |
| 2005/0148321 A1 * | 7/2005 | Igarashi et al. | 455/411 |
| 2005/0254514 A1 | 11/2005 | Lynn | |
| 2006/0002299 A1 | 1/2006 | Mushtaq et al. | |
| 2006/0085357 A1 * | 4/2006 | Pizarro | 705/64 |
| 2006/0212928 A1 * | 9/2006 | Maino et al. | 726/4 |
| 2006/0253703 A1 | 11/2006 | Eronen et al. | |
| 2007/0154016 A1 | 7/2007 | Nakhjiri et al. | |

OTHER PUBLICATIONS

Internet Engineering Task Force; RFC2104—HMAC: Keyed-Hashing for Message Authentication (Feb. 1997).
Internet Engineering Task Force; RFC2868—RADIUS Attributes for Tunnel Protocol Support (Jun. 2000).
Internet Engineering Task Force; RFC3576—Dynamic Authorization Extensions to Remote Authentication Dial in User Service (RADIUS) (Jul. 2003).
Internet Engineering Task Force; RFC4282—The Network Access Identifier (Dec. 2005).
Internet Engineering Task Force; RFC5176—Dynamic Authorization Extensions to Remote Authentication Dial in User Service (RADIUS) (Jan. 2008).
Calhoun, Pat R., et al., "Diameter Framework Document" The Internet Society, Mar. 2001, 32 pages, http://tools.ietf.org/pdf/draft-ietf-aaa-diameter-framework-01.pdf.
Merino, Ana Sanz, et al., Secure Authentication System for Public WLAN Roaming, Mobile Networks and Applications 10, Springer Science + Business Media, Inc. 2005, pp. 355-370, http://portal.acm.org.proxygw.wrlc.org/ft_gateway.cfm?id=1145920&type=pdf&coll=portal&dl=ACM&CFID=31928527& CFTOKEN=45701696.

* cited by examiner

*Primary Examiner* — Philip Lee
(74) *Attorney, Agent, or Firm* — Zilka-Kotab, PC (57) ABSTRACT

To fortify trust in a roaming environment, a token is introduced in transactions between an authoritative entity (e.g., a Home AAA in RADIUS) and a service providing entity (e.g., a NAS in RADIUS). A Token-Information is sent from the authoritative entity to the service providing entity during the initial authentication. Subsequent transactions include a token computed from the Token-Information. The service providing entity discards messages that it receives that do not contain the correct token. The Token-Information is transported in an encrypted fashion. The token provides secure transactions when messages between the authoritative entity and the service providing entity are routed through proxy servers.

17 Claims, 8 Drawing Sheets

SECURING DYNAMIC AUTHORIZATION MESSAGES

BACKGROUND OF THE INVENTION

1. Field of the Invention

The present invention relates to mobile communications, and more particularly, to securing communications between a service providing entity and an authoritative entity.

2. Background of Invention

An increasingly large number of individuals use portable computing devices, such as laptop computers, personal data assistants (PDAs), smart phones and the like, to support mobile communications. The number of computing devices, and the number of networks that these devices connect to, has increased dramatically in recent years.

The service provider allowing access to its network usually requires a mobile node and/or a mobile user to authenticate that it is entitled to access the network before it is granted network access. Authentication is the process of identifying a device or user. For example, when logging on to a computer network, user authentication is commonly achieved using a username and password. Authentication is distinct from authorization, which is the process of giving devices or individuals access to services and features based on their identity. Authentication merely ensures that an individual is who he or she claims to be, but does not address the access rights of the individual.

In a typical wireless Internet environment, WiFi based hotspots could be adjacent or distributed in cellular telephone networks. When the services of wireless LAN and cellular networks are integrated, the mobile device (e.g., laptop computer) can move across networks. There are two types of roaming: roaming between the same type of network (e.g., wireless LAN to wireless LAN or cellular network to cellular network) is defined as horizontal roaming; roaming between different types of networks, such as a wireless LAN and a cellular network, is defined as vertical roaming.

In many roaming environments the business entity that is delivering a service and the business entity that is authorizing the service sometimes do not have a direct relationship. Transactions between these entities tend to flow through intermediaries that are trusted in a hop-by-hop fashion. That is, each business entity trusts its neighbor and thus a chain of trust is established.

The chain of trust is formed during authentication where the authentication transaction is routed to the entity performing the authentication through intermediaries that have a trust-relationship with its neighbor until the transaction reaches the authenticating entity. The response of the authentication is routed back over the same path.

During the lifetime of the session the path or the chain of trust over which these transactions transact may change. There are many factors that change the initial trust chain. Intermediaries may fail, or the entity being authenticated may roam into different parts of the network. Furthermore, the intermediaries typically service more then one trust chain.

Trust is an important aspect to the endpoints of these transactions. These transactions affect service in many ways. These transactions can change aspects of the service such as bandwidth or terminate the service. Thus, the entity that is providing service needs to be assured that it is receiving service-modifying transaction from the authoritative entity that is the original authenticating entity or its agent.

In the roaming scenario above, where direct transaction between the service providing entity and the authoritative entity is not possible this assurance is hard to provide.

Authentication, Authorization, and Accounting (AAA) protocols such as Remote Authentication Dial In User Service (RADIUS) and Diameter are typically used to build such systems. The RADIUS protocol defines a message exchange used to authenticate an entity in a roaming environment where the service providing entity (e.g. the Network Access Server (NAS)) is separated from the authoritative entity (e.g. the Home RADIUS server) by intermediaries that only have a direct trust relationship with their immediate neighbors. Furthermore, RADIUS also provides a protocol extension called Change of Authorization (COA) Request and Disconnect Request (DR) for changing the authorization of an ongoing session that is initiated by the authoritative entity.

Change of Authorization Request and Disconnect Request messages are sent from a Dynamic Authorization Client (e.g. RADIUS Server) to a Dynamic Authorization Server (e.g. NAS) to modify attributes of a previously established authentication session or to terminate a previously established authentication session. For RADIUS these are defined by "RFC 5176: Dynamic Authorization Extensions to Remote Authentication Dial In User Service (RADIUS)" by the Internet Engineering Task Force (IETF), the disclosures of which are hereby incorporated by reference.

RFC5176 provides the following:

Where a NAS is shared by multiple providers, it is undesirable for one provider to be able to send Disconnect-Request or CoA-Requests affecting the sessions of another provider.

A Dynamic Authorization Server MUST silently discard Disconnect-Request or CoA-Request packets from untrusted sources.

RFC5176 describes one scheme called Reverse Path Forwarding (RPF) where by the receiver of the COA-Request or Disconnect-Request checks to verify that a Disconnect-Request or CoA-Request originates from an authorized Dynamic Authorization Client.

To perform the RPF check, the Dynamic Authorization Server uses the session identification attributes included in Disconnect-Request or CoA-Request packets, in order to determine the RADIUS server(s) to which an equivalent Access-Request could be routed. If the source address of the Disconnect-Request or CoA-Request is within this set, then the CoA-Request or Disconnect-Request is forwarded; otherwise it MUST be silently discarded.

Typically the Dynamic Authorization Server will extract the realm from the Network Access Identifier [RFC4282] included within the User-Name or Chargeable-User-Identity Attribute, and determine the corresponding RADIUS servers in the realm routing tables. If the Dynamic Authorization Server maintains long-term session state, it MAY perform the authorization check based on the session identification attributes in the CoA-Request. The session identification attributes can be used to tie a session to a particular proxy or set of proxies, as with the NAI realm.

Where no proxy is present, the RPF check can only be performed by the NAS if it maintains its own a realm routing table. If the NAS does not maintain a realm routing table (e.g. it selects forwarding proxies based on primary/secondary configuration and/or liveness checks), then an RPF check cannot be performed.

While this solution works, it has problems in the proxy scenario. First and foremost, routing is not necessarily performed on session identification attributes such as User-Name; routing may be performed on many different attributes present in the access request messages which may or may not appear in the Change of Access or Disconnect messages.

Second, the RPF Check scheme fails in the case where routing may change due to failures or routing optimizations. The current RPF scheme may prevent routing optimizations or failure recovery of the COA-Request and Disconnect-Request. Because any change to the routing paths may not pass the RPF Check. The scheme proposed by this invention allows the COA-Request and Disconnect-Request messages to be routed directly to the NAS or via any intermediary thus allowing for routing path optimizations and circumventing routing failures.

Third, it does not prevent an unauthorized entity that MAY be trusted from injecting a COA or Disconnect Request message. For example, two intermediaries may be valid forwarders of a COA or Disconnect Request messages for a given realm. However, for a given session only the intermediary that was on the authentication path should be the entity that is authorized to forward the COA or Disconnect messages. However, the RPF mechanism does not provide a mechanism to prevent or even detect such unauthorized use.

What is needed are systems and methods that secure communications between a service providing entity and an authoritative entity that are not dependent on message routing.

SUMMARY OF THE INVENTION

The present invention provides systems and methods that secure communications between a service providing entity and an authoritative entity that are not dependent on message routing.

To fortify the trust relationship between the service providing entity and the authoritative entity, a token is introduce in the transactions. Token-Information that will enable the service providing entity to validate the token is sent from the authoritative entity during the initial authentication (where the trust chain is strongest) to the service providing entity along the trusted chain of intermediaries. A token that is constructed from the Token-Information is then included in every subsequent transaction sent from the authoritative entity or trusted intermediary to the service providing entity. The service providing entity uses the Token-Information received in the initial authentication to validate the token. Thus, the presence of a validated token in a transaction indicates that the transaction originated from the authoritative entity or any other intermediary in the trust chain.

In the case of RADIUS, the home AAA server sends the Token-Information to the NAS during Access-Authentication. Later, when the home AAA server wants to send a COA-Request or a Disconnect-Request, it includes a token derived from the Token-Information sent to the NAS during initial Access-Authentication. When the NAS receives a COA-Request or Disconnect-Request, it only acts on those messages that contain a token derived from the Token-Information received during Access-Authentication. If the token is not valid (not derived from the Token-Information), the NAS silently discards the COA-Request or Disconnect-Request message. The RPF may be used for backward compatibility when the token is absent.

The Token-Information sent to the service providing entity (NAS) contains a secret, a lifetime, a timestamp used for replay protection, and a security parameter index (SPI) that is globally unique to that session and a validity lifetime for the token. The Token-Information is encrypted during the authentication response using hop-by-hop encryption (for example, as described in "RFC 2868: RADIUS Attributes for Tunnel Protocol Support," by the IETF, the disclosure of which is hereby incorporated by reference) and sent from the authoritative server to the service providing network. Thus, a Man-In-The-Middle (MITM) will not be able to intercept the information. The invention provides for replay protection so that a MITM will not be able to replay a transaction. Tokens used in subsequent transaction are not required to be encrypted.

When the authoritative entity (Home AAA) sends a COA or DR it uses the Token-Information previously sent to the service providing network (NAS) to compute a Token. The token contains a cryptographic signature of the contents of the COA or DR message which the Home AAA wants to protect from the non-authoritative entities from making changes. The Home AAA includes a timestamp, and the security parameter index (SPI) in the computation. The cryptographic signature is computed using a function such as the HMAC function [RFC2104] utilizing the secret sent in the Token-Information. It sends the token along with the COA or DR message to the service providing network.

When the service providing network receives the COA or DR message, it validates the timestamp in the Token to make sure that the COA or DR message has not be replayed. It uses the SPI in the token and other information in the message to locate the Token-Information previously received and uses the secret contained in the Token-Information to compute its own version of the signature over the contents of the message that was signed by the Home AAA. If the signature computed matches the signature contained in the received Token, it knows that the COA or DR came from the trust chain.

To strengthen security, cryptographic agility can be provided by having the NAS send a list of cryptographic functions that it supports for the computation of the secret. In this case, the AAA server selects the strongest algorithm from the set and indicates the selection in the Token-Information.

In an embodiment, the mobile node includes, but is not limited to laptop computers, cellular phones, smart phones, and personal data assistants.

In an embodiment, the implementation is based on a generic network access via the RADIUS AAA protocol. The network access type can be of various types i.e. WiFi, WiMAX, wireline, etc. It can also be extended for applications requiring AAA authentications.

Further embodiments, features, and advantages of the invention, as well as the structure and operation of the various embodiments of the invention are described in detail below with reference to accompanying drawings.

BRIEF DESCRIPTION OF THE FIGURES

The present invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
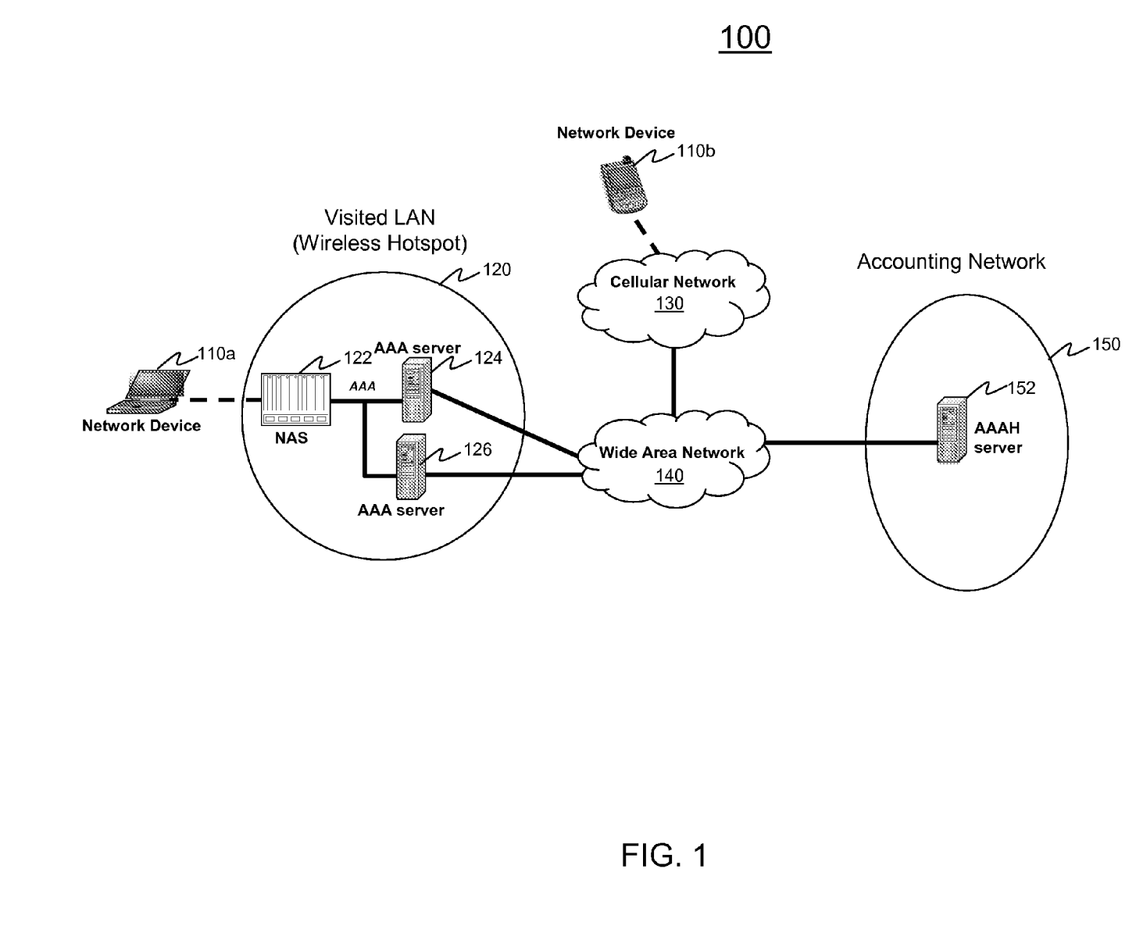
FIG. 1 provides a network diagram of a portion of a roaming environment.

FIG. 1 provides a network diagram of a portion of a roaming environment 100. The diagram provides a simplified network view that can be used to illustrate the authentication procedures needed when a mobile device roams from one network to another. Roaming environment 100 includes network device 110a, network device 110b, visited LAN 120, Network Access Sever (NAS) 122, Authentication, Authorization, Accounting (AAA) server 124, AAA server 126, cellular network 130, Wide Area Network (WAN) 140, accounting network 150 and home AAA (AAAh) 152.

In the example of FIG. 1, mobile devices 110a and 110b seek network access to mobile networks. Mobile devices include any known mobile devices that seek access to a mobile network including, but not limited to: PDAs, laptops, cellular telephones, etc. Mobile device 110a seeks access to wireless LAN hot spot 120. In the exemplary embodiment, Wireless LAN 120 is a 802.11 wireless LAN. However, Wireless LAN can include any known type of wireless LAN. Mobile device 110b seeks access to cellular network 130. Cellular network can be any known cellular network including, but not limited to: GSM, WiMax, EDGE. Although, the exemplary embodiment is described in the context of network device 110a seeking access to wireless LAN hot spot 120, this is for descriptive purposes only, the systems and methods described herein can also apply to cellular network 130, and other types of networks, as would be appreciated by one of ordinary skill in the art. Further, the systems and methods described herein can also be incorporated into wired networks.

In the example of FIG. 1, visited LAN 120 includes network access sever (NAS) 122, Authentication, Authorization, Accounting (AAA) server 124, and AAA server 126. Visited LAN 120 supports access and authentication of mobile users. AAA server 124 and AAA server 126 are coupled to home AAA (AAAh) servers 152 via wide area network 140. Wide Area Network 140 can be any network connecting a mobile network to an accounting network. In the exemplary embodiment WAN 140 is the internet.

In the example of FIG. 1, accounting network 150 is a network used by a service provider to perform authentication, authorization, accounting functions. Accounting network 150 includes home AAA server 152. Home AAA server 152 is used to authorize and authenticate a user of a mobile device.

Referring to FIG. 1, when mobile device 110a attaches to NAS 122, it needs to authenticate with its home AAA server 152 before network access is granted. The authentication can be based on EAP (Extensible Authentication Protocol), where mobile device 110a, AAA server 124 and home AAA server 152 take on EAP roles. When the authentication is based on EAP, EAP messages are transported between the mobile device 110a acting as an EAP peer to the NAS 122, the EAP Authenticator, using any of many transport methods, such as 802.1x, PANA, and the like. The transport between NAS 122 and home AAA server 152 is typically carried over AAA protocol using RADIUS or Diameter. The EAP messages travel through a either AAA server 124 or AAA 126, zero or more broker AAA server(s) (not shown), and finally arrive at the home AAA server 152.

Figure 2:
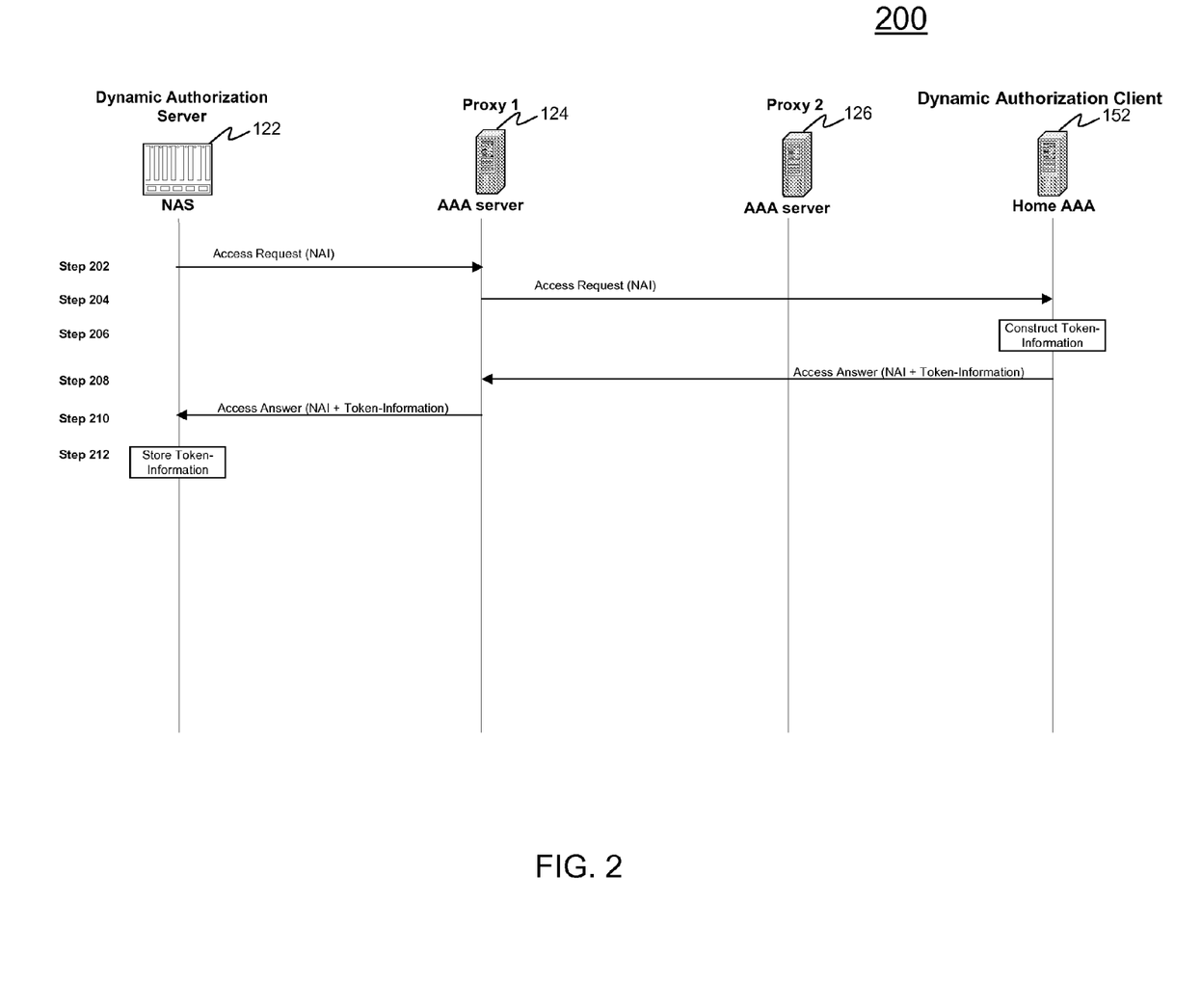
FIG. 2 provides a method for an authentication and authorization procedure that increases security for subsequent communications between a service entity and an authoritative entity.

FIG. 2 provides an exemplary flow diagram 200 illustrating a method for increasing the security of communications between a service entity and an authoritative entity. The exemplary flow diagrams of FIGS. 2-5 include a service entity, a authoritative entity, any number of servers located between the service entity and the authoritative entity.

In FIGS. 2-5, a service entity is represented by NAS 122. It should be noted that a service entity can include any dynamic authorization server.

In FIGS. 2-5, an authoritative entity is represented by home AAA 152. It should be noted that an authoritative entity can include any dynamic authorization client.

In FIGS. 2-5, the servers between the service entity and the authoritative entity include two proxy servers represented by AAA server 124 and AAA server 126. It should be noted that the servers between the service entity and the authoritative entity can include any number of servers of any type.

FIG. 2 shows an AAA authentication and authorization procedure. The procedure begins at step 202.

At step 202, NAS 122 sends an access request (AR) message containing a network access identifier (NAI) towards home AAA server 152. It should be noted that the access request message can contain other identifiers such as a list of supported cryptographic algorithms that can be used to compute the signature contained in the Token. In FIG. 2, the access request message is sent through AAA server 124.

At step 204, AAA server 124 receives the access request message and forwards the access request message to the home AAA server 152.

At step 206, home AAA server 152 authenticates the subscriber and constructs a the Token-Information for NAS 122.

At step 208, the Token-Information is sent to NAS 122 in an access answer (AA) through AAA server 124. In the case of RADIUS the Token-Information is encrypted when it is communicated between home AAA 152 and AAA server 124. By encrypting the token, interception of the token can be prevented.

At step 210, AAA server 124 forwards the answer containing the Token-Information to NAS 122. The Token-Information is encrypted when it is communicated between AAA server 124 and NAS 122.

At step 212, NAS 122 stores the Token-Information. The Token-Information is stored so the NAS can use the Token-Information to validate subsequent messages containing a token derived from the Token-Information as described in accordance with FIGS. 3-5.

It should be noted that during re-authentication procedures home AAA 152 preferably computes a new Token-Information for the re-authorization.

Figure 3:
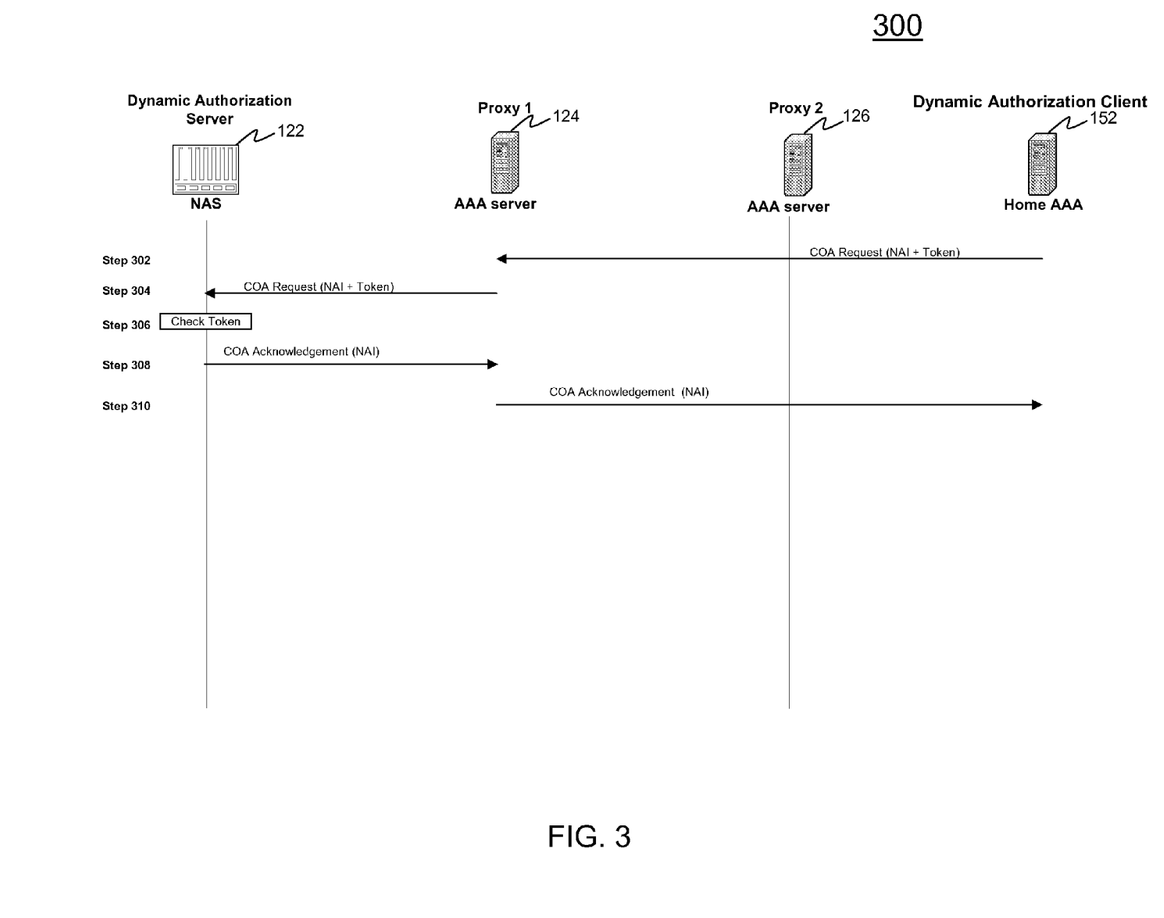
FIG. 3 provides an exemplary flow diagram illustrating a secure transaction between a service entity and an authoritative entity.

FIG. 3 provides an exemplary flow diagram 300 illustrating a secure transaction between a service entity and an authoritative entity through a successful change of authorization transaction. Flow diagram 300 assumes that the service entity has a copy of a Token-Information provided by a authoritative entity. Reference is made to FIG. 2 which illustrates providing the Token-Information to a service entity from an authoritative entity. Representations of elements in FIG. 3 are described in accordance with FIG. 2 and for the sake of brevity will not be described herein. Flow diagram 300 begins at step 302.

At step 302, the home AAA server 152 initiates a change of authorization by sending a change of authorization (COA) request containing the NAI of the user whose session is to be modified and a token. The AAA 152 computes a cryptographic signature using the secret previously sent in the Token-Information in step 206 of FIG. 2. and a cryptographic function such as HMAC [RFC2104] over the contents of the message to be protected which contains a timestamp and the SPI. The AAA 152 places the computed signature in the token with the SPI and timestamp. The token can be appended to the COA request or embedded within the COA request. The COA request is sent to AAA server 124. It should be noted that the COA request can alternatively be sent to AAA server 126.

At step 304, AAA server 124 receives the COA request and forwards the COA request to NAS 122. The COA message sent between AAA server 124 and NAS 122 includes the token.

At step 306, NAS 122 receives the COA request message containing the NAI and token. NAS 122 parses the token from the COA request message. The NAS 122 compares the timestamp in the token to make sure that the message was not replayed. Then the NAS 122 uses information within the token (the SPI) to locate the matching Token-Information received previously in step 210 of FIG. 2. The NAS 122 uses the secret contained in the Token-Information to compute a signature over the contents to be protected in the received message and validates its version of the computed signature with the signature contained in the received token. If the signatures match, the NAS 122 then performs the actions specified by the COA request and replies with a COA acknowledge message to the AAA server 124.

At step 308, home AAA 152 receives the COA acknowledge from AAA server 124. By receiving the COA acknowledge, home AAA 152 can verify that the action was executed correctly.

Figure 4:
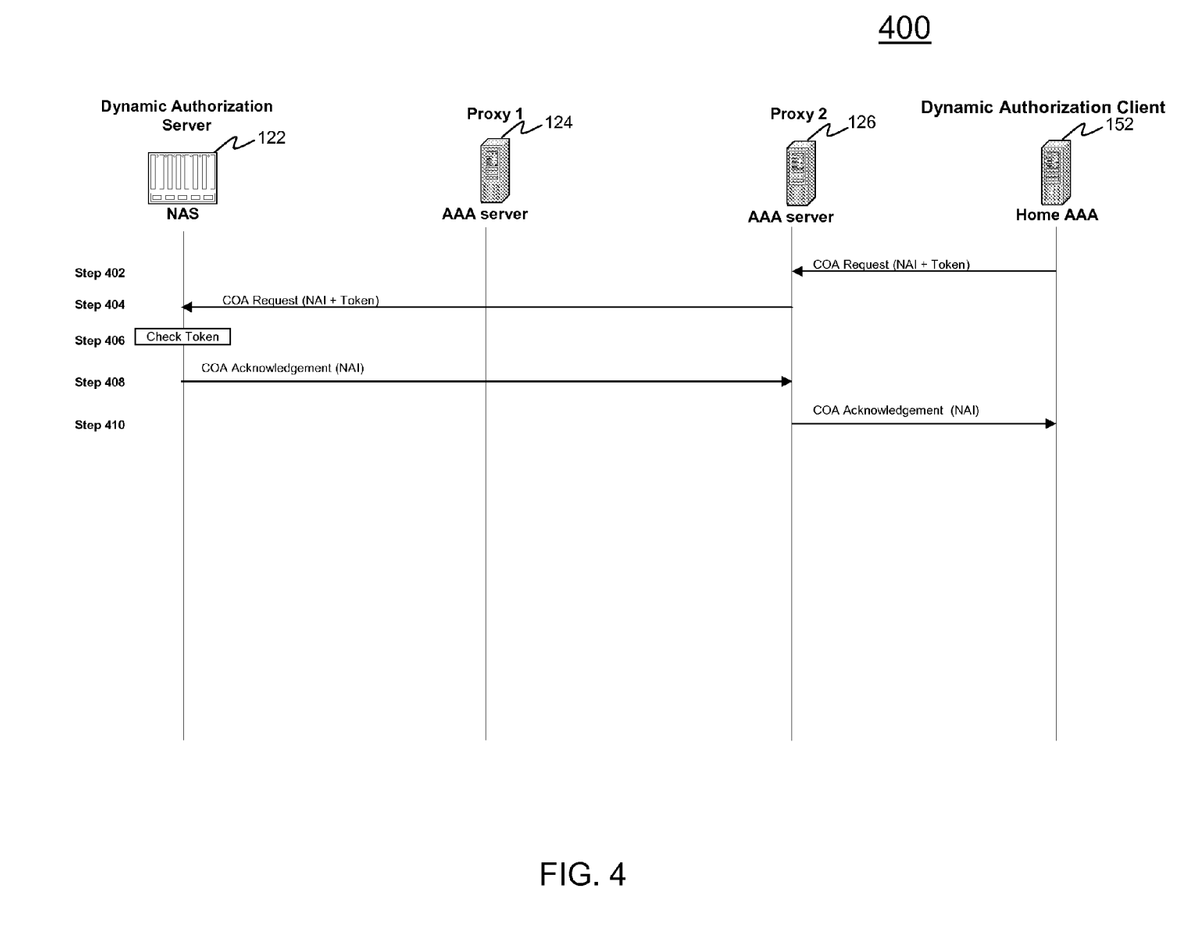
FIG. 4 provides an exemplary flow diagram illustrating a secure transaction between a service entity and an authoritative entity.

FIG. 4 provides an exemplary flow diagram 400 illustrating a secure transaction between a service entity and an authoritative entity through a successful change of authorization transaction. In particular, FIG. 4 illustrates a successful change of authorization via a proxy server that was not involved in the initial authentication. Flow diagram 400 assumes that the service entity has a copy of a token provided by an authoritative entity. Reference is made to FIG. 2 which illustrates providing a Token-Information to a service entity from an authoritative entity. Representations of elements in FIG. 4 are described in accordance with FIG. 2 and for the sake of brevity will not be described herein. Flow diagram 400 begins at step 402.

At step 402, the home AAA 152 initiates a change of authorization by sending a change of authorization (COA) request containing the NAI of the user whose session is to be modified and the token computed as in step 302 of FIG. 3. This COA message is sent to AAA server 126. As shown in FIG. 2, AAA server 126 did not observe the initial authentication and thus does not have the Token-Information. The lack of the token information means that the AAA server 126 is not able to compute a valid signature of the message and thus is unable to change the message without the NAS 122 detecting that the message was changed.

At step 404, AAA server 126 receives the COA request and forwards the COA request to NAS 122. The COA message sent between AAA server 126 and NAS 122 includes the token.

At step 406, NAS 122 receives the COA request message containing the NAI and token. NAS 122 parses the COA request message for a token and validates that the token as in step 306 of FIG. 3. If the token is valid, the NAS 122 then performs the actions specified by the COA request and replies with a COA acknowledge message to the AAA server 126.

At step 408, home AAA 152 receives the COA acknowledge from AAA server 126. By receiving the COA acknowledge, home AAA 152 can verify that the action was executed correctly.

Figure 5:
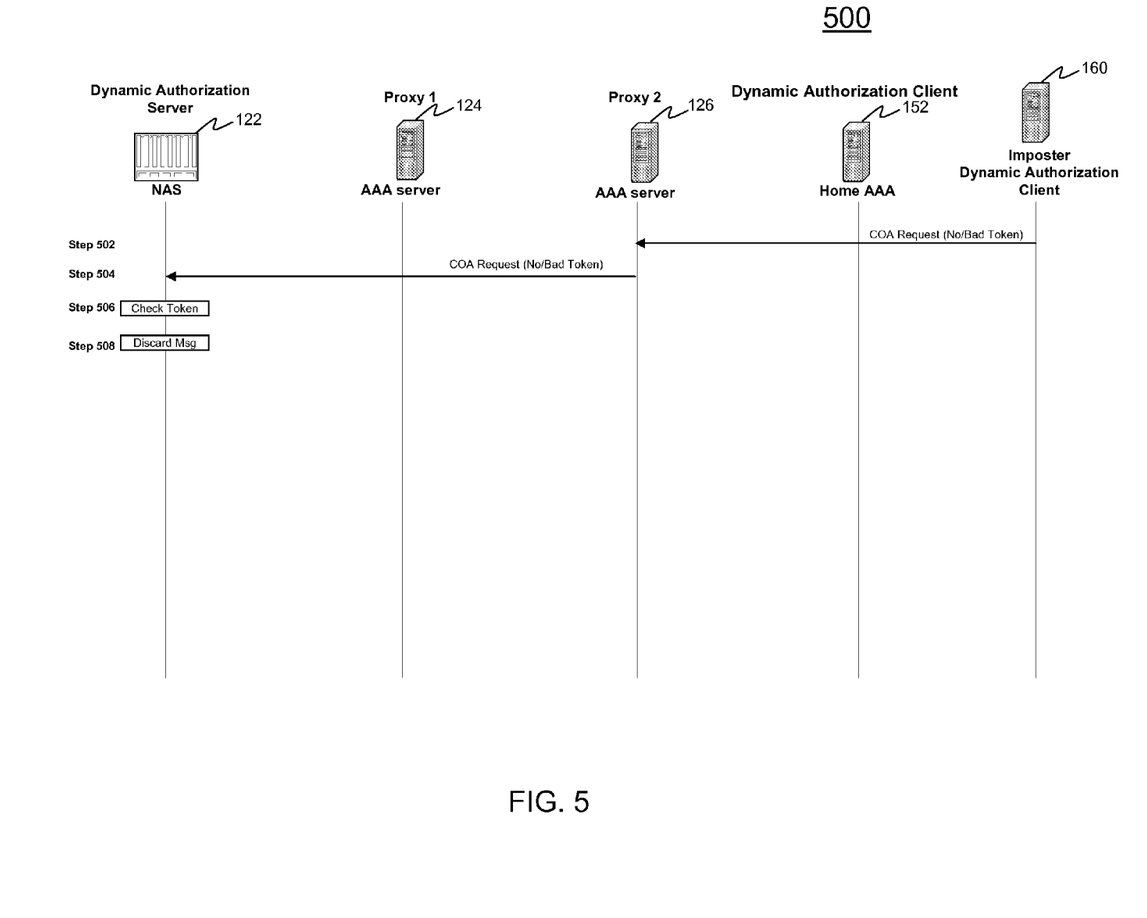
FIG. 5 provides an exemplary flow diagram illustrating an unauthorized transaction between a service entity and a imposter authoritative entity.

FIG. 5 provides an exemplary flow diagram 500 illustrating an unauthorized transaction between a service entity and an imposter authoritative entity. In particular FIG. 5 illustrates an imposter authoritative entity trying to execute a change of authorization. Flow diagram 500 assumes that the service entity has a copy of a token provided by an authoritative entity. Reference is made to FIG. 2 which illustrates providing a token to a service entity from an authoritative entity. Representations of elements in FIG. 5 are described in accordance with FIG. 2 and for the sake of brevity will not be described herein. In addition, FIG. 5 also includes an imposter authoritative entity 160. Flow diagram 500 begins at step 502. Imposter authoritative entity represents any entity trying to modify the access of NAS 122.

At step 502, imposter authoritative entity 160 sends a COA request message to AAA Proxy 126. Because the Token-Information was encrypted it is assumed that the imposter authoritative entity 160 does not know the Token-Information and as such, cannot compute a valid token and that the COA request message will contain a bad token or will not include a token at all. It should be noted that AAA server 124 should not repair a bad token or compute a new token using the Token-Information that it received earlier in step 208 in FIG. 2 if the token is missing.

At step 504, NAS 122 receives the COA request from AAA server 126. If the token is missing, the NAS 122 silently discards the COA request. The NAS 122 validates the token as in step 306 in FIG. 3. If the COA request contains a token that does not match the token received during authentication procedures, the NAS 122 silently discards the COA request.

It should be noted that as described in step 202, if AAA server 126 knows that token is bad, it will still forward the message to NAS 122. This is because during re-authentication the token may have changed. However, in one embodiment, if the COA request is missing a token, AAA server 126 can forward the COA request to NAS 122. In another, embodiment, if the COA request is missing a token, AAA server 126 can discard the COA request. It may be more efficient for the AAA server 126 to discard a COA request without a token, but this may prevent legacy implementations from sending COA-requests.

Figure 6:
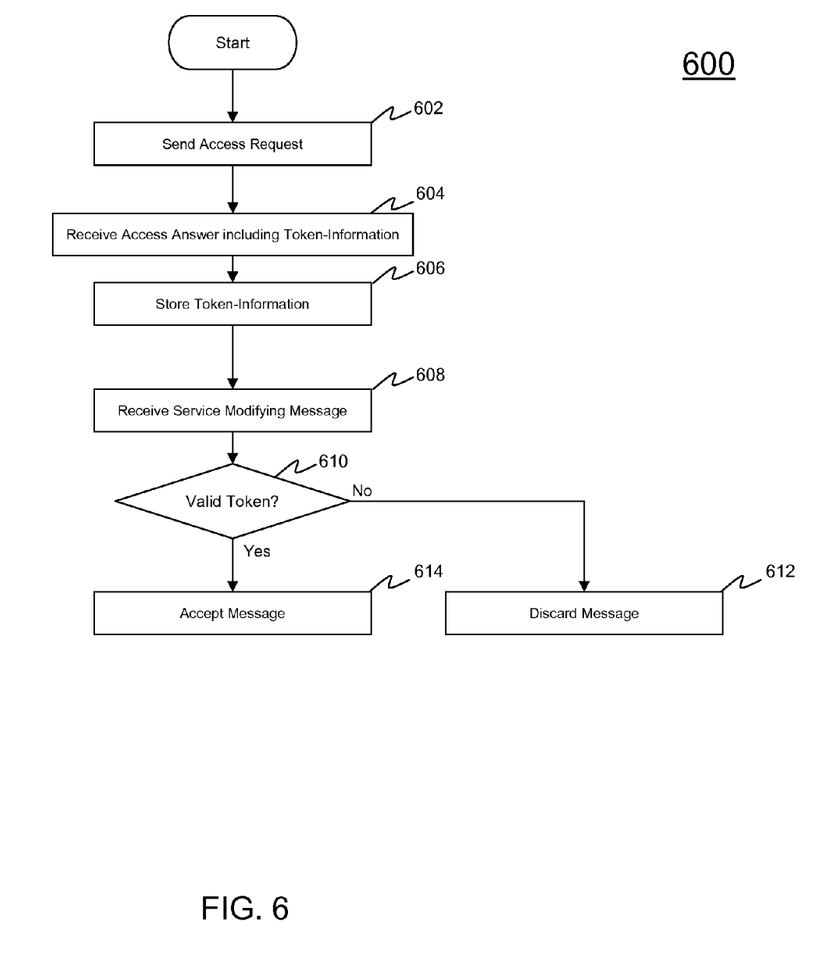
FIG. 6 provides an exemplary method for a service entity to enhance the security of communications FIG. 7 provides an exemplary method for an authorization entity to enhance the security of communications.

FIG. 6 provides an exemplary method 600 for a service entity to enhance the security of communications. It should be noted that messages in method 600 can be specified according to Diameter or RADIUS AAA protocols, where the service entity is a dynamic authorization server. Method 600 begins at step 602.

At step 602, the service entity sends an access request to an authoritative entity.

At step 604, the service entity receives an access answer including a Token-Information from the authoritative entity.

At step 606, the service entity stores the Token-Information.

At step 608, the service entity receives a service modifying message. The service modifying message may be from the actual authoritative entity or from an imposter authoritative entity.

At step 610, the service entity determines if the message received in step 608 contains a valid token computed from a previously received Token-Information in order to validate that the message came from the authoritative entity. If the message does not include a valid token, method 600 continues to step 612. If the message does include a valid token, method 600 continues to step 614.

At step 612, the service entity discards the message.

At step 614, the service entity accepts the message and performs any instructions included in the message.

Figure 7:
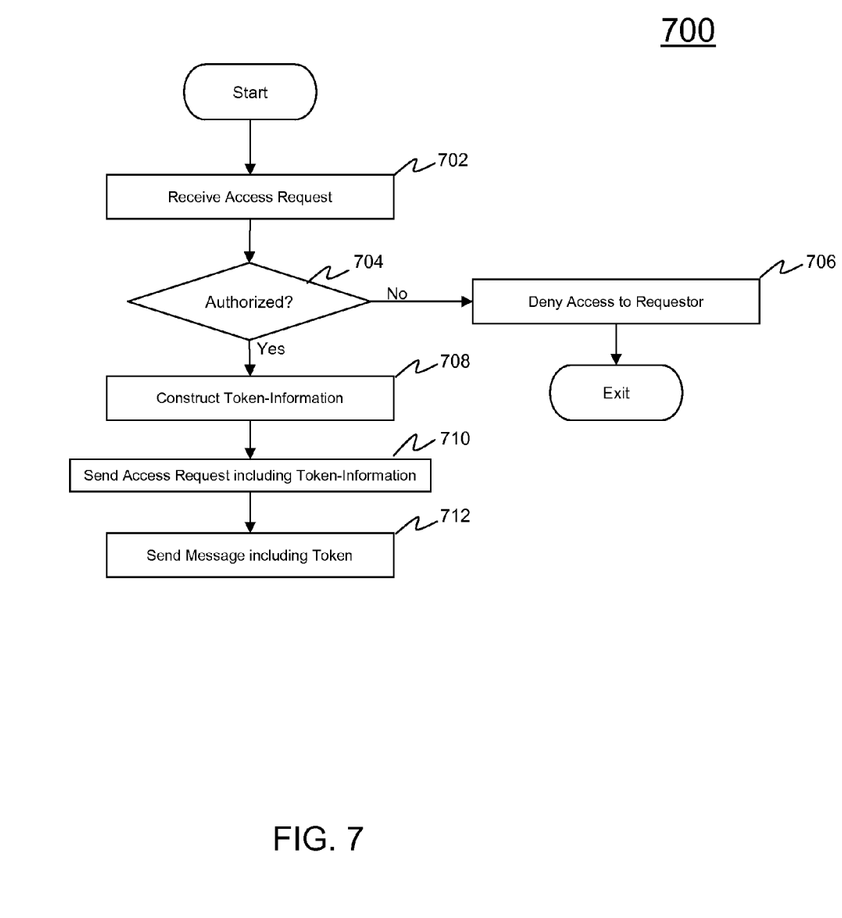

FIG. 7 provides an exemplary method 700 for an authorization entity to enhance the security of communications. It should be noted that messages in method 700 can be specified according to Diameter or RADIUS AAA protocols, where the authorization entity is a dynamic authorization client. Method 700 begins at step 702.

At step 702, the authorization entity receives an access request.

At step 704, the authorization entity determines if access is authorized. If access is not authorized, method 700 continues to step 706. If access is authorized, method 700 continues to step 708.

At step 706, the authorization entity denies access to the request. This can include sending a message to the requestor indicating why access was denied or simply not responding to the requestor's access request.

At step 708, the authorization entity constructs a Token-Information.

At step 710, the authorization entity sends an access accept message to the requestor. The access accept message includes the Token-Information constructed in step 708.

At step 712, the authorization sends zero or more subsequent messages to the requestor. These messages include tokens computed from the Token-Information constructed in step 708.

Computer System Implementation

Figure 8:
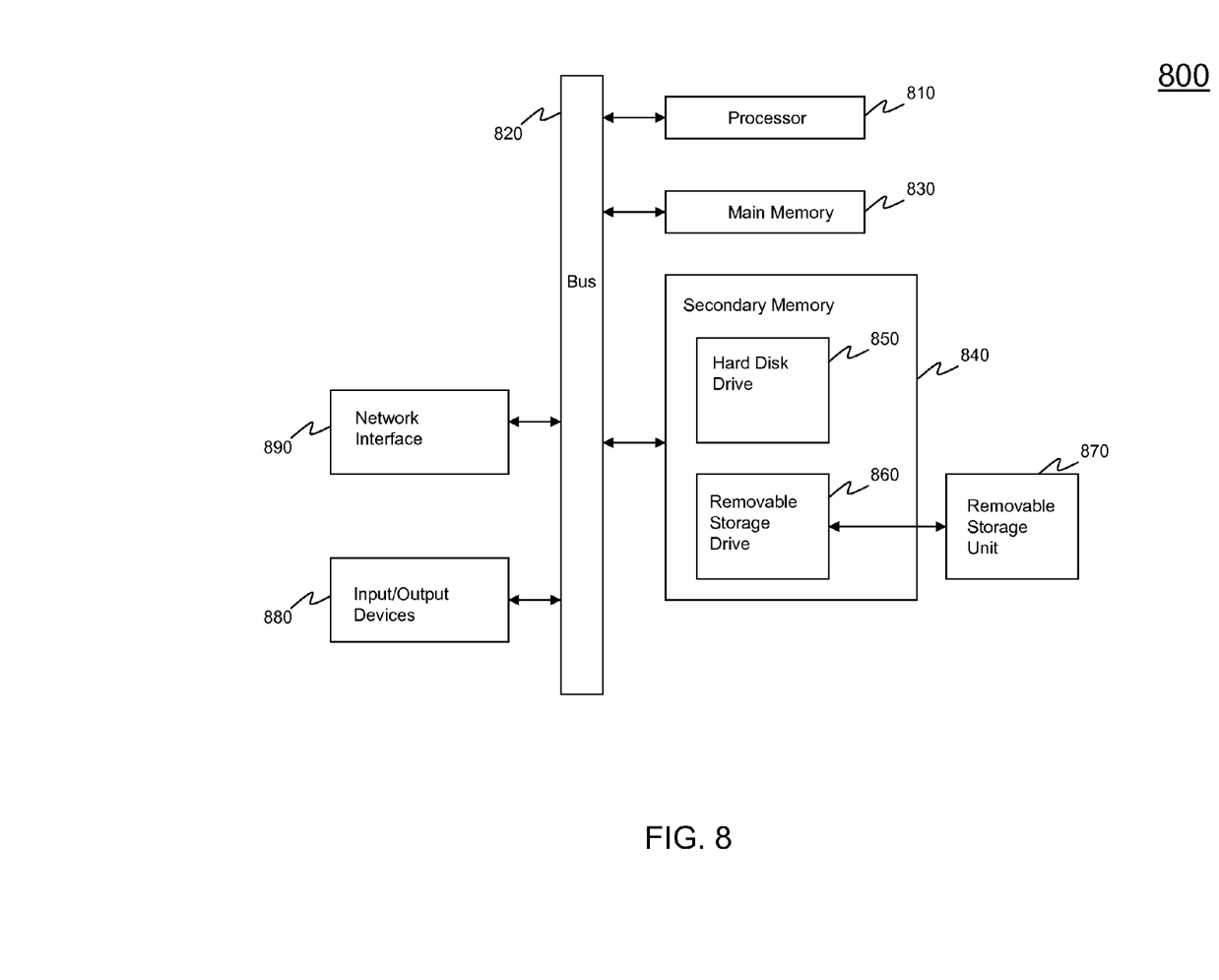
FIG. 8 is a diagram of a computer system on which the methods and systems herein described can be implemented, according to an embodiment of the invention.

In an embodiment of the present invention, the methods and systems of the present invention described herein are implemented using well known computers, such as a computer 800 shown in FIG. 8. The computer 800 can be any commercially available and well known computer capable of performing the functions described herein, such as computers available from International Business Machines, Apple, Sun, HP, Dell, Cray, etc.

Computer 800 includes one or more processors (also called central processing units, or CPUs), such as processor 810. Processor 800 is connected to communication bus 820. Computer 800 also includes a main or primary memory 830, preferably random access memory (RAM). Primary memory 830 has stored therein control logic (computer software), and data.

Computer 800 may also include one or more secondary storage devices 840. Secondary storage devices 840 include, for example, hard disk drive 850 and/or removable storage device or drive 860. Removable storage drive 860 represents a floppy disk drive, a magnetic tape drive, a compact disk drive, an optical storage device, tape backup, ZIP drive, JAZZ drive, etc.

Removable storage drive 860 interacts with removable storage unit 870. As will be appreciated, removable storage unit 860 includes a computer usable or readable storage medium having stored therein computer software (control logic) and/or data. Removable storage drive 860 reads from and/or writes to the removable storage unit 870 in a well known manner.

Removable storage unit 870, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 800, or multiple computer 800s to perform any combination of the functions described herein Computer programs (also called computer control logic) are stored in main memory 830 and/or the secondary storage devices 840. Such computer programs, when executed, direct computer 800 to perform the functions of the present invention as discussed herein. In particular, the computer programs, when executed, enable processor 810 to perform the functions of the present invention. Accordingly, such computer programs represent controllers of the computer 800.

Computer 800 also includes input/output/display devices 880, such as monitors, keyboards, pointing devices, etc.

Computer 800 further includes a communication or network interface 890. Network interface 890 enables computer 800 to communicate with remote devices. For example, network interface 890 allows computer 800 to communicate over communication networks, such as LANs, WANs, the Internet, etc. Network interface 890 may interface with remote sites or networks via wired or wireless connections. Computer 800 receives data and/or computer programs via network interface 890. The electrical/magnetic signals having contained therein data and/or computer programs received or transmitted by the computer 800 via interface 890 also represent computer program product(s).

The invention can work with software, hardware, and operating system implementations other than those described herein. Any software, hardware, and operating system implementations suitable for performing the functions described herein can be used.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A method of establishing secure communications between a service entity and an authoritative entity, comprising:
   transmitting a subscriber access request message to the authoritative entity;
   receiving an access answer message containing a Token-Information from the authoritative entity, wherein the Token-Information includes a secret, a lifetime, a timestamp and a security parameter index (SPI); and
   discarding service modification messages that do not contain a token computed from the previously received Token-Information.

2. The method according to claim 1, wherein the transmitting and the receiving include communicating according to RADIUS or Diameter protocols.

3. The method according to claim 1, wherein the transmitting and the receiving include routing by one or more proxy entities.

4. A method of establishing secure communications between a service entity and an authoritative entity comprising:
- transmitting a subscriber access request message to the authoritative entity;
- receiving an access answer message from the authoritative entity containing a Token-Information, wherein the Token-Information includes a secret, a lifetime, a timestamp and a security parameter index (SPI);
- storing a copy of the Token-Information;
- receiving a service modification message;
- parsing the service modification message for a token containing a reference signature;
- computing a signature over contents of the service modification message using the previously received Token-Information; and
- validating that the computed signature matches the reference signature; and
- if the validating reveals that the computed signature matches the reference signature, performing instructions included in the service modification message and sending an acknowledgement to the authoritative entity, otherwise discarding the service modification message.

5. The method according to claim 4, further comprising: discarding the service modification message if it does not contain a token.

6. A method of establishing secure communications between a service entity and an authoritative entity, comprising:
- receiving a subscriber access request message from the service entity;
- authenticating the subscriber access request message and constructing a Token-Information, wherein the Token-Information includes a secret, a lifetime, a timestamp and a security parameter index (SPI);
- transmitting an access accept message including the Token-Information to the service entity; and
- transmitting a service modification message including a token computed from the Token-Information to the service entity.

7. The method according to claim 6, wherein the receiving, the transmitting the access accept message, and the transmitting the service modification message include communicating according to RADIUS or Diameter protocols.

8. The method according to claim 6, wherein the receiving, the transmitting the access accept message, and the transmitting the service modification message include routing through one or more proxy entities.

9. A method of establishing secure communications between a service entity and an authoritative entity, comprising:
- receiving a subscriber access request message from a service entity, wherein the subscriber access request is associated with a subscriber;
- authenticating the subscriber;
- constructing a Token-Information, wherein the Token-Information includes a secret, a lifetime, a timestamp and a security parameter index (SPI);
- transmitting an access accept message including the Token-Information to the service entity; and
- transmitting a service modification message to the service entity including a token computed from the Token-Information.

10. The method according to claim 9, wherein the transmitting the access accept message, the transmitting the service modification message, and the receiving include communicating according to RADIUS or Diameter protocols.

11. The method according to claim 9, wherein the transmitting the access accept message, the transmitting the service modification message, and the receiving include routing through one or more proxy entities.

12. A system for establishing secure communications using an authorization and authentication protocol, comprising:
- a network access server configured to:
  - provide a mobile network device access to a wireless local area network,
  - transmit and receive messages according to at least one of RADIUS and Diameter protocols,
  - parse a service authorization message for a Token-Information, wherein the Token-Information includes a secret, a lifetime, a timestamp and a security parameter index (SPI),
  - store a copy of the Token-Information,
  - parse a change of authorization message for a token containing a reference signature,
  - compute a signature based on contents of the change of authorization message using the previously received Token-Information;
  - compare the computed signature with the reference signature; and
  - if the computed signature and the reference signature are the same, perform instructions included in the change of authorization message and send an acknowledgement message to an authoritative entity, otherwise discard the change of authorization message; and
- an authorization server configured to:
  - transmit and receive messages according to at least one of RADIUS and Diameter protocols,
  - construct a Token-Information in response to authenticating a received access request, wherein the Token-Information includes a secret, a lifetime, a timestamp and a security parameter index (SPI),
  - embed the constructed Token-Information in an access answer message, and
  - embed a token computed from the constructed Token-Information in a change of authorization message.

13. The system according to claim 12, further comprising: at least one proxy server configured to receive and forward communications between the network access server and the authorization server.

14. A non-transitory computer readable storage medium having program instructions stored thereon that, when executed by at least one processor, cause the at least one processor to perform a method of establishing secure communications between a service entity and an authoritative entity, comprising:
- transmitting a subscriber access request message to the authoritative entity;
- receiving an access answer message containing a Token-Information from the authoritative entity, wherein the Token-Information includes a secret, a lifetime, a timestamp and a security parameter index (SPI); and
- discarding service modification messages that do not contain a token computed from the previously received Token-Information.

15. The computer readable storage medium of claim 14, wherein the transmitting and the receiving include communicating according to RADIUS or Diameter protocols.

16. The computer readable storage medium of claim 14, wherein the transmitting and the receiving include routing by one or more proxy entities.

17. The computer readable storage medium of claim 14, wherein the timestamp is used to prevent replay of the service modification messages.

* * * * *